United States Patent [19]

James

[11] 4,239,440
[45] Dec. 16, 1980

[54] RETRACTABLE LOAD LIFTING AND MOVING APPARATUS PARTICULARLY ADAPTED FOR USE ON MOTOR VEHICLES

[76] Inventor: Larry R. James, 26260 W. 135th St., Olathe, Kans. 66061

[21] Appl. No.: 8,390

[22] Filed: Feb. 1, 1979

[51] Int. Cl.³ .............................................. B60P 1/54
[52] U.S. Cl. .................................... 414/542; 414/540
[58] Field of Search ................ 414/498, 500, 540–542, 414/921; 212/56; 244/137 R

[56] References Cited

U.S. PATENT DOCUMENTS

| | | | |
|---|---|---|---|
| 1,910,026 | 5/1933 | Lima | 414/542 |
| 2,292,870 | 8/1942 | Dixon | 414/542 |
| 2,730,249 | 1/1956 | Edwards | 414/542 |
| 2,778,512 | 1/1957 | Strona | 414/542 |
| 2,969,157 | 1/1961 | Panes | 414/542 |
| 3,276,610 | 10/1966 | Thatcher | 414/541 |
| 3,341,038 | 9/1967 | Wicklund | 414/542 |
| 3,794,192 | 2/1974 | Monson | 414/541 |
| 3,957,164 | 5/1976 | Brown | 414/921 X |

Primary Examiner—Stephen G. Kunin
Assistant Examiner—Terrance L. Siemens
Attorney, Agent, or Firm—Schmidt, Johnson, Hovey & Williams

[57] ABSTRACT

Apparatus for transferring a load into and out of the bed or load receiving space of a pickup truck or other cargo hauling vehicle employs base structure mountable on the vehicle, horizontally reciprocable boom structure carried by the base structure, winch structure carried by the boom structure adjacent the distal extremity of the latter, and selectively actuatable mechanisms associated with the base structure and respectively coupled with the boom and winch structures for operating the latter independently to accomplish vertical lifting or lowering and horizontal movement in either direction of a load during emplacement or removal of same relative to the load receiving space along a path having limited clearance as compared with the size of the load. The nature of the apparatus provides an operationally and economically practical solution to the need for safe and reliable equipment for handling the loading and unloading of even relatively heavy loads to be hauled in trucks, vans or the like as to which considerations of clearances, available space and cost render conventional hoisting equipment impractical.

11 Claims, 8 Drawing Figures

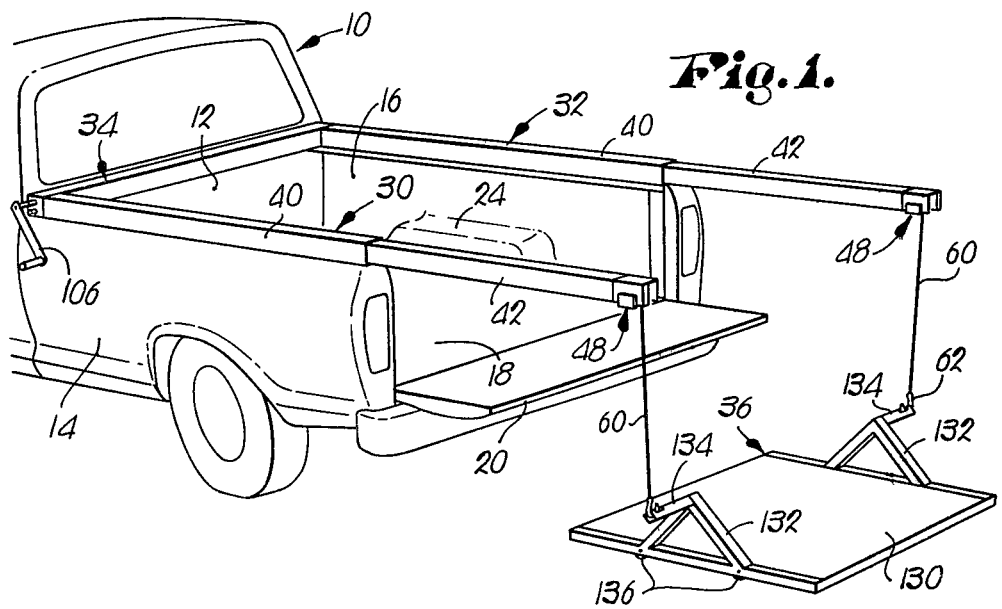
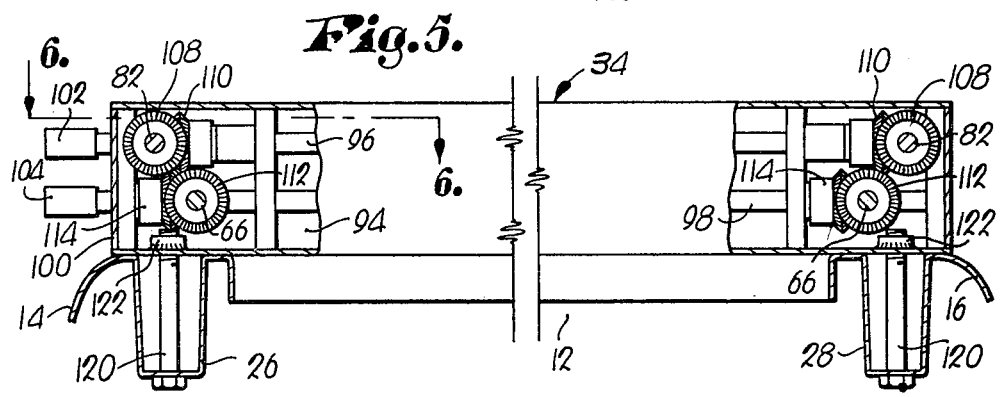
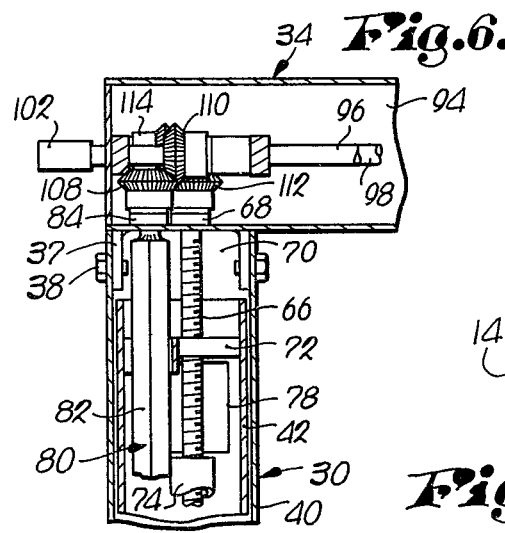
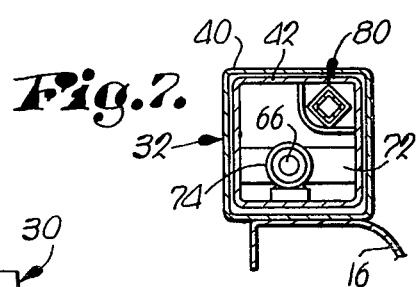

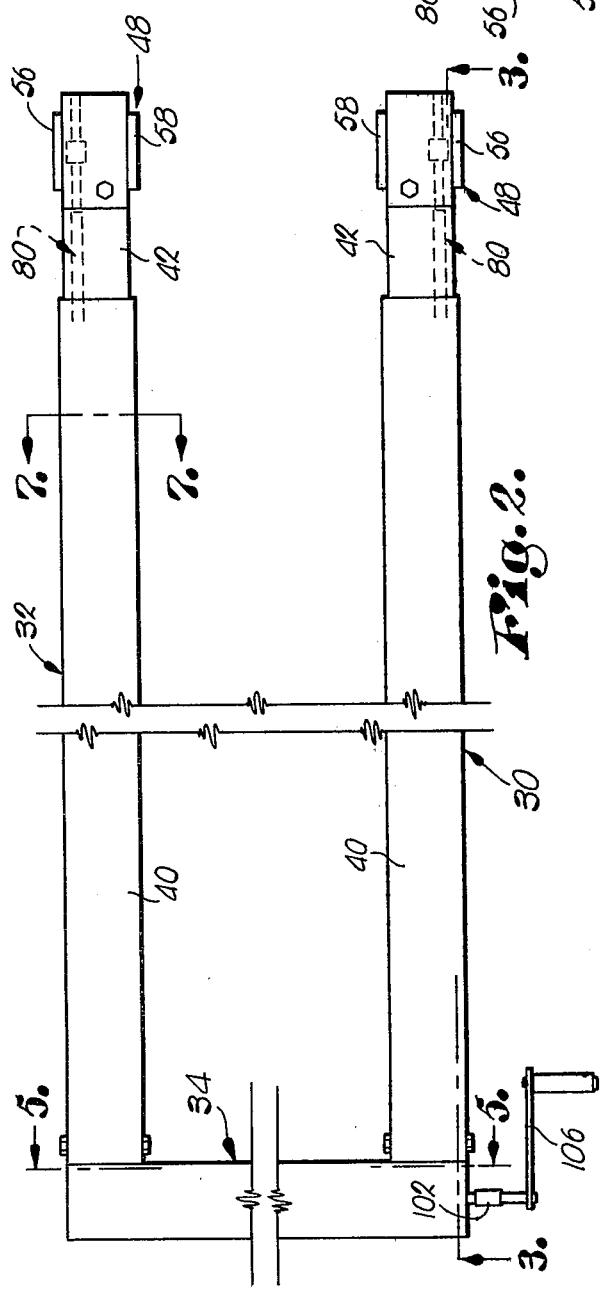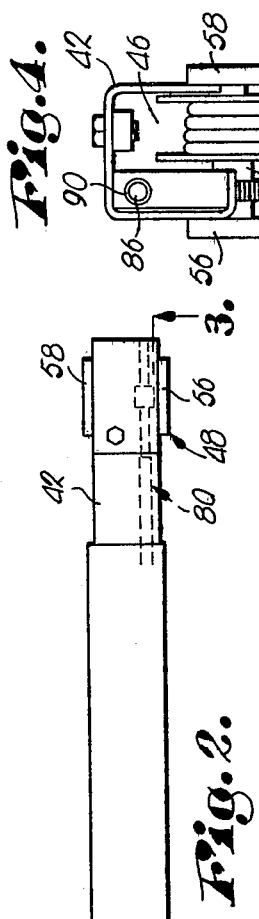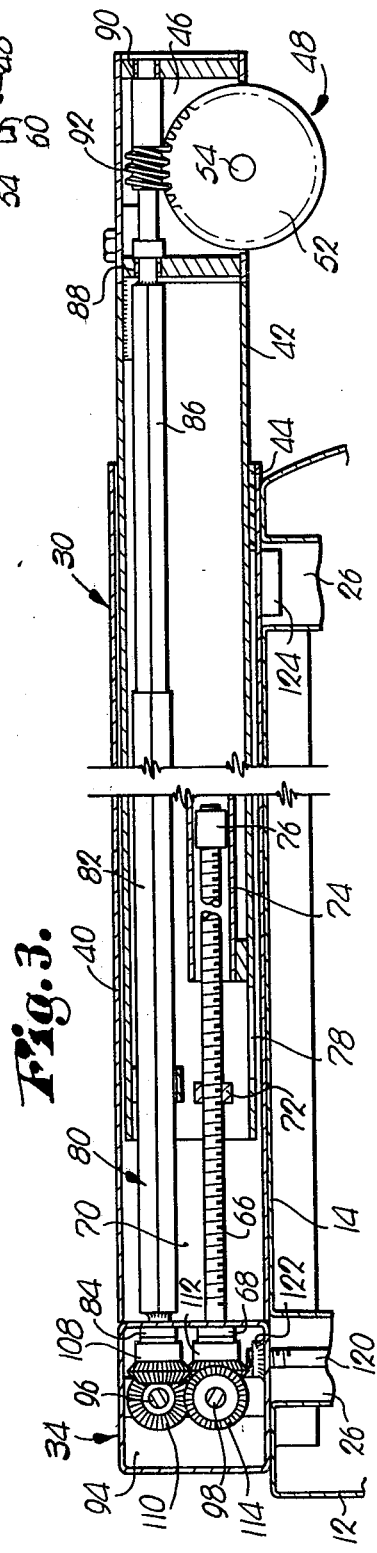

RETRACTABLE LOAD LIFTING AND MOVING APPARATUS PARTICULARLY ADAPTED FOR USE ON MOTOR VEHICLES

BACKGROUND OF THE INVENTION

1. Field of the Invention

This invention relates to apparatus mountable on motor vehicles, such as pickup trucks, vans and the like, for lifting and moving loads between the beds or cargo receiving space of such vehicles and the ground beyond and beneath an open extremity of the load receiving space through a zone of clearance limited by the structure of the vehicle itself.

My improved apparatus, by virtue of the nature and arrangement of the cooperating mechanical structures employed therein, achieves relative simplicity and economy of fabrication and installation as compared with conventional hoisting equipment, together with ease, reliability and safety of operation even by a single individual, and avoids encroachment upon the often limited cargo space typically available in the class of vehicles for which it is optimumly adapted.

2. Description of the Prior Art

The types of prior hoisting or load lifting equipment mountable upon motor vehicles for use in moving loads into and out of the cargo space within the vehicle of which I am aware fall into three general categories.

First, some trucks have been equipped with elevatable tail gates, which essentially serve as a vertical elevator onto which a load may be intermediately transferred and raised or lowered in the course of moving it between the cargo space of the truck and ground level. Such elevator structures typically employ hydraulic cylinders for supporting the load carrying assembly during movement along a vertical path to which it is confined by some form or track or guide mechanism that also serves to prevent tipping. By its very nature, however, that type of equipment is best incorporated into the truck during manufacture of the latter and is difficult and expensive, if not practically impossible, to add onto many existing vehicles not originally so equipped.

Secondly, some open top trucks have been equipped with crane-like hoists typically involving some sort of often rotatable base structure carrying a boom that is pivotally mounted on the base structure for angular swinging movement in an elevational plane by a hydraulic cylinder or the like, together with a winch located on the base structure or an adjacent part of the boom having its flexible element extending along the boom and passing over a pulley adjacent the distal end of the boom. Such crane-like equipment, however, usually encroaches on the space otherwise available for cargo, must be relatively heavy and expensively fabricated with a relatively long boom for effectively handling "off the rear" loading and unloading, requires some special skill for safe operation in "off the rear" load handling, and, of course, is ill-adapted or impossible to use with vehicles such as vans having closed tops over cargo spaces provided with relatively restricted clearance for loads only at one extremity thereof.

Thirdly, some trucks, especially of the flat bed type having no obstructions or only easily removable posts around the periphery of the cargo area, have been equipped with a form of hoist involving an upstanding base or pillar structure having a stiff, fixed length boom extending horizontally from the top of the base structure and rotationally swingable in a horizontal plane, together with a winch located on the base structure or an adjacent part of the boom having its flexible element extending along the boom and passing over a pulley adjacent the distal end of the boom. Such hoists, however, aside from being primarily adapted for "off the side" load handling operations when the base structure is prudently centered relative to the width of the truck, also suffer from essentially the same disadvantages as mentioned for crane-like hoists.

I am not acquainted with any prior load lifting and moving equipment mounted on trucks, which I believe to be of a type fully satisfactory and practical, operationally and economically, for installation and use upon motor vehicles such as existing conventional pickup trucks, vans and the like by the persons who typically utilize such vehicles.

SUMMARY OF THE INVENTION

My improved load lifting and moving apparatus, which is especially adapted for mounting and use on pickup trucks, vans and other vehicles having upstanding body structure bounding their cargo space, employs horizontally extensible boom means having base structure conveniently mountable in fixed disposition on the truck and relatively telescoped horizontally reciprocable boom structure cantilever supported from the base structure; winch means carried by the reciprocably extendable and retractable, horizontal boom structure adjacent the distal extremity of the latter, so that the vertical length of the flexible element of the winch means coupled with the load will not be affected by horizontal movement of the boom structure; and separately actuatable meas operable from adjacent the base structure and coupled with the reciprocable boom structure and the winch means respectively for independently controlling the latter. The base and boom structures are preferably tubular and enclose the screw utilized to extend and retract the reciprocable boom structure and the extensible telescoped shaft utilized to operate the winch.

In my preferred construction, I employ a pair of extensible boom assemblies in spaced parallelism for mounting upon the body structure at the opposite sides of the vehicle, with their respective winch means coupled with the corresponding sides of a load lifting platform, and with lateral shafts extending between the assemblies for reciprocating the boom structures and operating the winches in tandem from actuating means common to both boom assemblies, although it should be understood that a single boom assembly may be employed and mounted upon the inner top body structure of vans and similar vehicles in which the cargo space is covered when that is appropriate in the light of the types of loads to be handled.

Those who are familiar with the types of equipment which have heretofore been available for the application contemplated by this invention will appreciate the unique practicality and many advantages of my improved apparatus for such application from the standpoints of economy of fabrication, ease of installation, lack of encroachment upon available cargo space, neatness when out of use and in retracted condition during normal employment of the vehicle between hauling runs, and overall reliability, safety and convenience of operation even for persons not accustomed to handling load moving equipment.

BRIEF DESCRIPTION OF THE DRAWINGS

In the accompanying drawings:

FIG. 1 is a fragmentary perspective view of an illustrative vehicle in the nature of a typical pickup truck showing my currently preferred embodiment of my improved apparatus installed thereon;

FIG. 2 is a top plan view of such apparatus;

FIG. 3 is a cross-sectional view taken on line 3—3 of FIG. 2;

FIG. 4 is an end elevational view of the distal extremity of a boom structure of such apparatus, particularly showing the winch mounted adjacent such distal extremity;

FIG. 5 is a cross-sectional view taken on line 5—5 of FIG. 2;

FIG. 6 is a cross-sectional view taken on line 6—6 of FIG. 5;

FIG. 7 is a cross-sectional view taken on line 7—7 of FIG. 2; and

FIG. 8 is a schematic depiction of the general relationship of the load supporting platform of such apparatus to one boom structure thereof and to one side of the body structure and the wheel well of such truck.

DESCRIPTION OF THE PREFERRED EMBODIMENT

It should be understood that the currently preferred embodiment of my improved apparatus shown in the accompaning drawings and described hereunder is intended as illustrative of my invention, and that the invention should, therefore, be deemed as extending to the subject matter fairly encompassed by the claims which follow and mechanical equivalents thereof.

Referring initially to FIGS. 1, 3, 5 and 8, the pickup truck upon which my load lifting and moving apparatus is illustrated as being installed is generally designated 10 and includes a bed defined by frontal body structure 12, side body structure 14 and 16, bottom structure 18 and a conventional swingable tail gate 20 shown in opened condition as during use of my apparatus for loading or unloading of a load into or from the cargo receiving space provided by the bed. The side body structure 14 and 16 typically includes opposed wheel wells 22 and 24 protruding into the cargo space otherwise available in the bed of the truck 10. Stake sockets 26 and 28 are conventionally provided along the upper surfaces of side body structure 14 and 16 and are conveniently utilized in mounting my apparatus, as later described.

As most readily observable from FIGS. 1 and 2, my illustrative preferred apparatus broadly includes a pair of horizontally extensible, spaced apart, parallel boom assemblies 30 and 32 mounted atop the side body structure 14 and 16, a transversely extending, frontal bight assembly 34, and a load supporting platform structure 36. The frontal extremities of the assemblies 30 and 32 are suitably secured to the bight assembly 34 in any suitable manner, such as by tapped straps 37 welded to the assembly 36 and cooperating bolts 38, present a generally U-shaped arrangement of size accommodating to the size of the bed of the truck 10.

Referring now also to the other FIGS. as appropriate, since the boom assemblies 30 and 32 are of substantially identical construction (except for a reversal of positioning of certain internal rotating parts apparent from a comparison of FIG. 7 with FIGS. 5 and 6), it should be sufficient to describe only one of them. The boom assembly 30 (or 32) includes an elongate, tubular, horizontal, base structure 40 of generally square cross-section and an elongate, tubular, horizontal, boom structure 42 of generally square cross-section and somewhat smaller external transverse dimensions than the corresponding internal dimensions of the base structure 40. The boom structure 42 is partially telescoped into and slidably received within the base structure 40 for rearwardly extending and forwardly retracting, horizontally reciprocable movement relative to the latter, while remaining supported as a cantilever boom extending rearwardly from the base structure 40. A pad 44 of low-friction material may be provided within the base structure 40 beneath the boom structure 42 to facilitate reciprocable movement of the boom structure 42.

The boom structure 42 has an open bottomed chamber 46 adjacent its rearward distal extremity, which accommodates a winch mechanism 48 having a rotatable reel 50 and circular gear 52 both carried by a shaft 54 journalled upon the structure 42 as at 56 and 58. Secured to the reel 50 is a flexible cable or equivalent element 60, which depends from the reel 50 and is provided with coupling means such as a hook 62 at its lower distal end. As is apparent, the flexible element 60 is taken up or payed out from the reel 50 when the latter is rotated in a corresponding direction to raise or lower the hook 62.

The horizontally reciprocable boom structure 42 is rearwardly extended or forwardly retracted relative to the base structure 40 by means of an elongate, rotatable, threaded shaft or screw 66 forwardly journalled as at 68, extending rearwardly therefrom through the internal cavity 70 of the base structure 40, thence into threaded coupling with a tapped bracked or nut member 72 secured to the boom structure 42 adjacent the open rearward extremity of the latter, thence rearwardly from the nut member 72 within the interior of the tubular boom structure 42. Since the rearward portion of the screw shaft 66 may extend a considerable distance beyond the nut member 72, I prefer to provide a confining tube 74 therefor mounted rearwardly of the nut member 72 within the boom structure 42 and a grommet 76 of rubber or plastic upon the screw shaft 66 near the rear end thereof within the tube 74 to minimze objectionable vibration of the screw shaft 66 during travel of the truck 10. An opening 78 in the boom structure 42 is provided to facilitate assembly.

The winch 48 is rotated, in either direction as desired, by means of an elongate, extensible shaft 80 having a forward section 82 forwardly journalled as at 84 that is rearwardly hollow and of square internal cross-section to receive a somewhat transversely smaller, square rearward section 86 in telescoped sliding relationship thereto. The rearward shaft section 86 is rearwardly journalled as at 88 and 90 and carries a worm gear 92 meshed with the circular gear 52 of the winch 48 for rotating the latter responsive to rotation of the shaft 80.

The transverse forward assembly 34 is also tubular and of square cross-section to provide an internal cavity 94 for housing a pair of transverse operating shafts 96 and 98, common to both of assemblies 30 and 32, which are journalled therein in any suitable fashion. One end portion of each of the shafts 96 and 98 extends through an end wall 100 of the assembly 34, and such end portions are provided with fittings 102 and 104 respectively that are of polygonal cross-section or other suitable configuration for mating with and being selectively rotated in either direction by a removable manual actuating crank 106. Although motors could be used for turning the shafts 96 and 98, I have found the manual crank 106 arrangement most satisfactory and consistent with the objective of keeping my apparatus simple, reliable and inexpensive.

A bevel gear 108 on the forward end of the extensible shaft 80 of each of the boom assemblies 30 and 32 meshes with a corresponding one of a pair of bevel gears 110 on the transverse operating shaft 96 for simultaneously turning the shafts 80 in a direction to rotate both of the winch reels 50 in the same direction of raising or lowering the corresponding flexible element 60. Similarly, a bevel gear 112 on the forward end of the screw shaft 66 of each of the boom assemblies 30 and 32 meshes with a corresponding one of a pair of bevel gears 114 on the transversal operating shaft 98 for simultaneously turning the screws 66 in a direction to reciprocate both of the boom structures 42 in the same direction of extension or retraction thereof. Thus, coordinated reciprocation of the boom structures 42 and operation of the winches 48 of both of the assemblies 30 and 32 is assured upon rotation of the shafts 96 and 98 with the crank 106.

The assembly 34 and the base structures 40 of the assemblies 30 and 32 are conveniently and adequately mounted upon the body structure 14 and 16 of the truck 10 by means of bolts 120 inserted from below the forward stake sockets 26 and 28 and threaded into nuts 122 welded to the assembly 34, along with depending projections 124 on the base structures 40 fitted into more forwardly disposed stake sockets 26 and 28. Additional bolting could be used if desired; and those skilled in the art will also understand that the base structures 40 may be similarly mounted upon the body structures of vans or the like by bolting or even welding at appropriate locations, although bolting is preferred both for convenience of installation and to permit removal if that should become necessary.

As shown in FIG. 1, the load supporting platform structure 36, which I prefer for general purpose use when the load is of nature not adaptable for direct attachment of the hooks 62 thereto, includes a floor portion 130 and a pair of upstanding brackets 132 each having an outwardly extending portion 134 adapted to have a corresponding hook 62 coupled therewith. As indicated by FIG. 8, the floor portion 130 should be of lesser width than the distance between the wheel wells 22 and 24, and the bracket portions 134 should be at a height above the lower extremity of the structure 36 that exceeds the height of the wheel wells 22 and 24. If desired, small wheels 136 can be placed beneath the floor portion 130 to facilitate moving the platform structure 36 upon the ground or the bottom structure 18 of the truck 10.

With my improved apparatus, the movement of a load between the bed of the truck 10 and the ground, in either direction, is both quick and convenient for a single user, despite the often relatively tight clearances involved.

I claim:

1. In load lifting and moving apparatus, which is particularly adapted for use on a vehicle having a load receiving space that is at least partially enclosed by bottom structure located above ground level and by body structure located above said bottom structure and that is provided with a zone of vertical and lateral clearance adjacent one extremity of said bottom structure for horizontal passage of a load into or out of said space:

horizontally extensible boom means including base structure rigidly mountable on said body structure and elongate boom structure reciprocably carried by said base structure and longitudinally shiftable relative to the latter between a retracted condition in which said boom structure is distally disposed inwardly relative to the plane of said clearance zone and an extended condition in which said boom structure extends substantially horizontally from said base structure and distally outwardly beyond the plane of said clearance zone;

first selectively actuatable means carried by said base structure;

means for operably coupling said first actuatable means with said boom structure for shifting the latter between said retracted and extended conditions thereof;

winch means carried by said boom structure adjacent the distal extremity of the latter and including elongate flexible means and rotatable means to which said flexible means is secured and upon which said flexible means may be wound to permit taking up and paying out of said flexible means when said rotatable means is rotated in a corresponding direction;

means for operably coupling said flexible means into supporting relationship with a load to be lifted and moved;

second selectively actuatable means carried by said base structure; and means for operably coupling said second actuatable means with said winch means for rotating said rotatable means in either direction for taking up and paying out said flexible means to lift and lower said load respectively, said base structure being open at the extremity thereof nearest the plane of said clearance zone and provided with a cavity therein communicating with said open extremity for receiving at least a portion of the length of said boom structure therewithin, said boom structure being in telescoped relationship with said base structure and at least partially received within said cavity of the latter.

2. In apparatus according to claim 1, wherein:
said boom structure is provided with an internal chamber therein,
at least a portion of said rotatable means being disposed within said chamber,
the lower extremity of said chamber having an opening for clearing said flexible means.

3. In apparatus according to claim 2, wherein:
said base structure and said boom structure are each generally tubular, and
said means for coupling said second actuatable means with said winch means includes rotatable and extensible shaft means extending within said base structure and said boom structure and including a pair of relatively telescoped sections.

4. In apparatus according to claim 3, wherein:
said means for coupling said first actuatable means with said boom structure includes elongate, rotatable screw means extending within said base structure and threadably coupled with said boom structure adjacent the end of the latter remote from the plane of said clearance zone.

5. In apparatus according to claim 4, wherein:

said first and second actuatable means are disposed adjacent the extremity of said base structure remote from the plane of said clearance zone and include means for respectively rotating said shaft means and said screw means.

6. In apparatus according to claim 5, wherein:
said means for coupling said second actuatable means with said winch means includes circular gear means on said rotatable means and worm gear means on said telescoped shaft means operably engaged with said circular gear means.

7. In apparatus according to claim 6, wherein:
the portion of said boom structure telescoped within said base structure is slideably supported by the latter.

8. In load lifting and moving apparatus, which is particularly adapted for use on a vehicle having a load receiving space that is at least partially enclosed by bottom structure located above ground level and by body structure located above said bottom structure and that is provided with a zone of vertical and lateral clearance adjacent one extremity of said bottom structure for horizontal passage of a load into or out of said space:
boom means including a pair of spaced, generally parallel assemblies each including base structure and elongate boom structure,
said base structures being rigidly mountable on respectively opposite sides of said body structure,
said boom structures each being reciprocably carried by the corresponding base structure and longitudinally shiftable relative to the latter between a retracted condition in which said boom structure is distally disposed inwardly relative to the plane of said clearance zone and an extended condition in which said boom structure extends substantially horizontally from said base structure and distally outwardly beyond the plane of said clearance zone;
first selectively actuatable means adjacent the extremity of said boom means remote from the plane of said clearance zone,
said first actuatable means including first transverse operating shaft means extending from adjacent the extremity of one of said base structures remote from the plane of said clearance zone to adjacent the extremity of the other of said base structures remote from the plane of said clearance zone;
means for operably coupling said first actuatable means with each of said boom structures for shifting the latter between said retracted and extended conditions thereof,
said means for coupling said first actuatable means with said boom structures including a rotatable screw means for each of said boom structures respectively threadably coupled with the latter and operably coupled with said first operating shaft means for rotation of said screw means when said operating shaft means is rotated;
winch means for each of said boom structures respectively carried by the latter adjacent the distal extremity thereof,
each of said winch means including elongate flexible means and rotatable reel means to which said flexible means is secured and upon which said flexible means may be wound to permit taking up and paying out of said flexible means when said reel means is rotated in a corresponding direction;
load supporting means;
means for coupling both of said flexible means with said load supporting means;
second selectively actuatable means adjacent the extremity of said boom means remote from the plane of said clearance zone,
said second actuatable means including second transverse operating shaft means extending from adjacent the extremity of one of said base structures remote from the plane of said clearance zone to adjacent the extremity of the other of said base structures remote from the plane of said clearance zone; and
means for operably coupling said second actuatable means with each of said winch means for rotating said reel means of the latter in either direction for taking up and paying out said flexible means to lift and lower said load supporting means,
said means for coupling said second actuatable means with each of said winch means including an extensible, rotatable shaft means having a pair of relatively telescoped sections,
one of said sections of each of said telescoped shaft means being coupled by gear means including a worm gear with the corresponding reel means, and the other section of each of said telescoped shaft means being gear coupled with said second operating shaft means.

9. In apparatus according to claim 8, wherein:
said load supporting means includes platform structure of dimensions allowing the same to pass horizontally through said zone of clearance and disposing the same in overlapping relationship to said bottom structure when said platform structure is lifted by said winch means and said boom structures are shifted toward their said retracted condition.

10. In apparatus according to claim 9, further especially adapted for use on a vehicle having a load receiving space that is laterally restricted by opposed wheel wells extending thereinto adjacent said bottom structure, wherein:
said platform structure includes a floor portion of lateral dimension less than the distance between said wheel wells for fitting therebetween, and transversely outwardly and oppositely extending bracket portions elevated above said floor portion a distance greater than the height of said wheel wells above said bottom structure,
said bracket portions respectively extending beneath the distal extremity of the corresponding boom structure and having the corresponding flexible means coupled thereto.

11. In apparatus according to claim 10, wherein:
the elevation of said boom structures above said bottom structure is greater than the height of said bracket portions above the lowermost extremity of said platform structure.

* * * * *